(12) United States Patent
Elsberg et al.

(10) Patent No.: US 8,134,556 B2
(45) Date of Patent: Mar. 13, 2012

(54) METHOD AND APPARATUS FOR REAL-TIME 3D VIEWER WITH RAY TRACE ON DEMAND

(76) Inventors: Nathan Elsberg, Modiin (IL); Alex Hazanov, Katzir (IL)

( * ) Notice: Subject to any disclaimer, the term of this patent is extended or adjusted under 35 U.S.C. 154(b) by 911 days.

(21) Appl. No.: 12/126,948

(22) Filed: May 26, 2008

(65) Prior Publication Data
US 2008/0297505 A1    Dec. 4, 2008

Related U.S. Application Data

(60) Provisional application No. 60/940,728, filed on May 30, 2007.

(51) Int. Cl.
G06T 15/50    (2011.01)
G06T 15/60    (2006.01)
G09G 5/00     (2006.01)

(52) U.S. Cl. ......................... 345/426; 345/633

(58) Field of Classification Search .................. 345/426, 345/633
See application file for complete search history.

(56) References Cited

U.S. PATENT DOCUMENTS

| | | | | |
|---|---|---|---|---|
| 5,579,455 A | * | 11/1996 | Greene et al. | 345/422 |
| 5,694,533 A | * | 12/1997 | Richards et al. | 345/420 |
| 5,742,749 A | * | 4/1998 | Foran et al. | 345/426 |
| 5,832,106 A | | 11/1998 | Kim | |
| 5,870,097 A | * | 2/1999 | Snyder et al. | 345/426 |
| 5,905,657 A | | 5/1999 | Celniker | |
| 5,914,721 A | * | 6/1999 | Lim | 345/421 |
| 5,995,108 A | * | 11/1999 | Isobe et al. | 345/421 |
| 6,034,691 A | * | 3/2000 | Aono et al. | 345/582 |
| 6,084,979 A | | 7/2000 | Kanade et al. | |
| 6,111,582 A | * | 8/2000 | Jenkins | 345/421 |
| 6,128,577 A | | 10/2000 | Assa et al. | |
| 6,157,387 A | * | 12/2000 | Kotani | 345/589 |
| 6,313,837 B1 | | 11/2001 | Assa et al. | |
| 6,330,281 B1 | * | 12/2001 | Mann et al. | 375/240.12 |
| 6,348,919 B1 | * | 2/2002 | Murphy | 345/421 |
| 6,437,823 B1 | | 8/2002 | Zhang | |
| 6,731,284 B1 | * | 5/2004 | Oxaal | 345/427 |
| 6,760,024 B1 | * | 7/2004 | Lokovic et al. | 345/421 |
| 6,816,187 B1 | | 11/2004 | Iwai et al. | |
| 6,910,001 B2 | | 6/2005 | Hammersley et al. | |
| 6,930,715 B1 | | 8/2005 | Mower | |
| 7,324,116 B2 | * | 1/2008 | Boyd et al. | 345/582 |
| 7,477,777 B2 | * | 1/2009 | Wells | 382/154 |
| 7,523,411 B2 | * | 4/2009 | Carlin | 715/782 |
| 2002/0010734 A1 | * | 1/2002 | Ebersole et al. | 709/201 |
| 2002/0018063 A1 | * | 2/2002 | Donovan et al. | 345/426 |
| 2002/0093538 A1 | * | 7/2002 | Carlin | 345/778 |
| 2002/0113787 A1 | * | 8/2002 | Ray et al. | 345/424 |

(Continued)

OTHER PUBLICATIONS

Reeves et al.; Rendering Antialiased Shadows with Depth Maps; Jul. 1987; ACM; SIGGRAPH; vol. 21, No. 4.*

(Continued)

*Primary Examiner* — Xiao M. Wu
*Assistant Examiner* — David T Welch
(74) *Attorney, Agent, or Firm* — Simon Kahn

(57) ABSTRACT

A computer implemented method of providing a photo-realistic view on demand of a real-time interactive three dimensional simulation, the method comprising: providing a real-time interactive three dimensional simulation; selecting a camera position; and ray tracing the provided real-time interactive three dimensional simulation as a function of the selected camera position, the ray tracing providing the photo-realistic view.

17 Claims, 3 Drawing Sheets

U.S. PATENT DOCUMENTS

| | | | |
|---|---|---|---|
| 2002/0124236 A1* | 9/2002 | Ruths et al. | 717/104 |
| 2002/0133264 A1* | 9/2002 | Maiteh et al. | 700/182 |
| 2002/0144278 A1 | 10/2002 | Pratts et al. | |
| 2003/0103049 A1* | 6/2003 | Kindratenko et al. | 345/423 |
| 2003/0112237 A1* | 6/2003 | Corbetta | 345/426 |
| 2003/0189568 A1* | 10/2003 | Alkouh | 345/422 |
| 2004/0105573 A1* | 6/2004 | Neumann et al. | 382/103 |
| 2005/0091016 A1 | 4/2005 | Godavarthy et al. | |
| 2005/0140694 A1* | 6/2005 | Subramanian et al. | 345/619 |
| 2007/0078636 A1 | 4/2007 | Elsberg et al. | |
| 2007/0236485 A1* | 10/2007 | Trepte | 345/207 |
| 2008/0012863 A1 | 1/2008 | Finn et al. | |
| 2008/0027684 A1 | 1/2008 | Inzinga et al. | |
| 2008/0229234 A1 | 9/2008 | Astolfi et al. | |

OTHER PUBLICATIONS

Haller et al.; A Real-time Shadow Approach for an Augmented Reality Application Using Shadow Volumes; 2003; ACM.*

* cited by examiner

METHOD AND APPARATUS FOR REAL-TIME 3D VIEWER WITH RAY TRACE ON DEMAND

CROSS-REFERENCE TO RELATED APPLICATIONS

This applications claims priority to U.S. Provisional Patent Application Ser. No. 60/940,728, filed May 30, 2007, entitled "Method and Apparatus for Real-Time 3D Viewer with Ray Trace On Demand", the entire content of which is incorporated herein by reference.

TECHNICAL FIELD

The invention relates generally to the field of computer graphics, and in particular to a method of converting a real-time interactive three dimensional graphic simulation to a photo-realistic view on demand.

BACKGROUND

The use of interactive and dynamic 3D computer graphics is becoming prevalent in the computing world. Typically, 3D visualization applications provide photo-realistic results using techniques such as ray tracing, radiosity, global illumination and other shading, shadowing and light reflection techniques. Unfortunately, these techniques are computationally intensive, and thus photo-realistic results can not be viewed interactively; they are only viewable as a single raster image or stored as a series of raster images compiled in a time ordered sequence which may be viewed as a single animated playback.

The computational intensiveness of the prior art does not allow for real-time 3D interaction with models. The goal of these photo-realistic techniques and technologies is to achieve the highest possible level of photo-realism using many advanced, and often computing intensive and therefore time consuming, algorithms. These algorithms can take into account, to a very high level of detail, the subtle interactions of light, geometry and materials to produce computer generated images for which most people would have difficulty discerning that the image was computer generated as opposed to a true photograph of the subject. Particularly in the architecture visualization field many software applications are available which use ray tracing, scanline rendering, radiosity, caustics and global illumination techniques to produce ultra-realistic results.

Engineering and design projects have a need for a technology which enables designers, planners and developers to show in a virtual 3D world how a proposed project may look even before the first piece of construction equipment is brought onsite. The goal of the graphics engines behind these applications is to provide a realistic experience in the 3D graphic environment placing emphasis on enabling fluid and interactive motion. Such a goal is not met by the photo-realistic computational intensive visualization methods described above.

U.S. patent application Ser. No. 11/538,103 filed Oct. 3, 2006 to Elsberg et al, the entire contents of which is incorporated herein by reference, is addressed to a method of converting a computer aided design of a large scale project to a virtual reality based model. Advantageously, such a virtual reality based model enables fluid and interactive motion, and further enables investigation of line-of-sight and general geometric layout. Unfortunately, no provision exists for displaying the virtual reality based model, in a photo-realistic manner.

There is often a need by users of an interactive 3D simulation for photo-realistic views of the simulation for presentation, marketing and sales needs. The real-time 3D simulations of the prior art falls short, in that they are unable to provide the ultra high level of photorealism needed to meet this objective.

Similarly, an architect who may routinely employ photo-realistic techniques may need to provide an interactive dynamic model of the design to quickly and efficiently review a proposed design with a client or colleague involved in the design. In such cases the overhead in time required to produce photo-realistic results is unjustified.

There is thus a long felt need for a method of integrating a real-time interactive three dimensional graphic simulation with a means for producing a photo-realistic view.

SUMMARY OF THE INVENTION

In view of the discussion provided above and other considerations, the present disclosure provides methods and apparatus to overcome some or all of the disadvantages of prior and present teletherapy systems and methods. Other new and useful advantages of the present methods and apparatus will also be described herein and can be appreciated by those skilled in the art. Embodiments hereof provide for an integrated system providing real-time interactive 3D simulation and a mechanism for generating photo-realistic views on demand of the 3D simulation. By combining the two technologies into one system the invention provides an innovative solution which addresses the needs for both interactive 3D simulations and photo-realistic results in an automated system which can be operated effectively by a user with basic computer operating skills. Preferably, an automated expert system is implemented to optimize the aesthetic results of the ray tracing process.

The invention provides for a computer implemented method of providing a photo-realistic view on demand of a real-time interactive three dimensional simulation, the method comprising: providing a real-time interactive three dimensional simulation; selecting a camera position; and ray tracing the provided real-time interactive three dimensional simulation as a function of the selected camera position, the ray tracing providing the photo-realistic view.

In one embodiment the real-time interactive three dimensional simulation comprises objects and environment, and wherein the ray tracing comprises: drawing all objects of the provided real-time interactive three dimensional simulation as a function of the selected camera position with no lighting and no textures; reading the depth buffer values corresponding to the drawing with no lighting and no textures; drawing environmental objects of the provided real-time interactive three dimensional simulation as a function of the selected camera position with lighting and textures; reading the current color buffer and storing it in a separate color buffer; iterating the viewport pixel by pixel; and performing, in the event that the depth buffer of a particular pixel is less than one, a ray tracing algorithm on the particular pixel.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawing.

DETAILED DESCRIPTION

Figure 1:
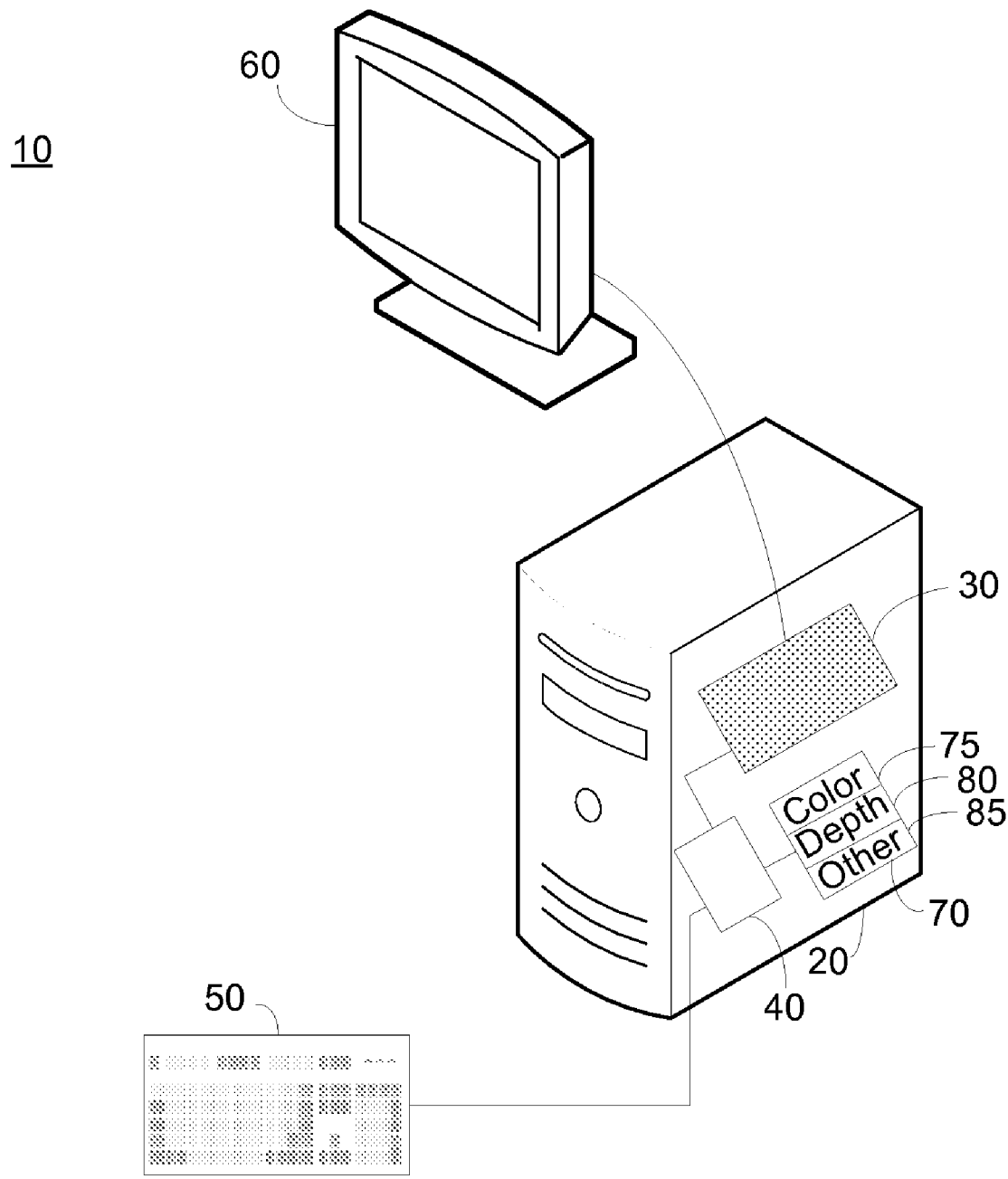
FIG. 1 illustrates a high level block diagram of a computing platform in accordance with a principle of the current invention.

The present embodiments enable an integrated system providing real-time interactive 3D simulation and a mechanism for generating photo-realistic views on demand of the real-time interactive 3D simulation. By combining the two technologies into one system the invention provides an innovative solution which addresses the needs for both real-time interactive 3D simulations and photo-realistic results in an automated system which can be operated effectively by a user with basic computer operating skills. Preferably, an automated expert system is implemented to optimize the aesthetic results of the ray tracing process.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The term real-time interactive three dimensional simulation, as used herein, includes, but is not limited to, real-time three dimensional virtual reality simulations. The term real-time interactive three dimensional simulation, as used herein, further includes, but is not limited to, three dimensional publishing and real-time three dimensional visualization software such as Adobe Acrobat 3D software, available from Adobe Systems, Inc., San Jose Calif.; and the DWF viewer available from Autodesk, Inc., San Rafael, Calif.

FIG. 1 illustrates a high level block diagram of a computing platform 10 in accordance with a principle of the current invention comprising: a computing device 20 comprising a graphics card 30, a processor 40 and a memory 70; a user input device 50; and a monitor 60. Memory 70 exhibits dynamically assignable memory locations comprising: a color buffer 75, a depth buffer 80 and an other memory locations 85. Monitor 60 is connected to the output of graphics card 30 and computing device 20 is connected to user input device 50. Processor 40 is in communication with graphics card 30, memory 70 and user input 50.

User input device 50 is illustrated as a keyboard, however this is not meant to be limiting in any way. The use of any or all of a pointing device, a voice input, or a touch screen is equally applicable and is specifically included. Memory 70 is illustrated as being internal to computing device 20; however this is not meant to be limiting in any way. Memory 70 may be provided external to computing device 20, such as a network server without exceeding the scope of the invention. Memory 70 comprises a scene-graph, preferably based on 3D CAD geometry, located in other memory locations 85, and computing device 20 is operative to convert the scene graph to real-time interactive 3D virtual-reality images for viewing on monitor 60. Memory 70 of computing device 20 is further operative to store the method according the principle of the invention in computer readable format for execution by computing device 20.

In operation, computing device 20 loads a scene graph from memory 70, and translates the scene graph to a real-time interactive 3D simulation to be continuously rendered. In an exemplary embodiment the scene graph is translated in accordance with the teaching of U.S. patent application Ser. No. 11/538,103 filed Oct. 3, 2006 to Elsberg et al referenced above. User inputs are obtained via user input device 50 to move the camera of the real-time interactive 3D simulation to a desired position, and to request a photo-realistic view responsive to the current camera position.

Processor 40 of computing device 20 is operative to ray trace the real-time interactive 3D simulation responsive to the camera position, and present the resulting photo-realistic view of the real-time interactive 3D simulation on a view port of monitor 60. The real-time interactive 3D simulation typically comprises physical objects and environmental objects. Preferably, processor 40 uses an automated expert system to reduce the processing time of the ray trace. In particular, the automated expert system first draws the physical objects of the scene of the real-time interactive 3D simulation as a function of the camera position with no lighting and no textures utilizing graphics card 30. The depth buffer values are then read by processor 40 from graphics card 30 and stored on depth buffer 80. Preferably this is performed using an OpenGL application programming interface (API). OpenGL is a standard for graphics programming available from the OpenGL Architecture Review Board, care of the Kronos Group, Chillicothe, Ohio.

Processor 40 then draws the environmental objects, such as a sky dome and/or a ground plane, with full lighting and textures utilizing graphics card 30. The drawn environmental objects are then stored in color buffer 85 of memory 70 responsive to processor 40.

Processor 40 then iterates the scene pixel by pixel, and for each pixel iterated processor 40 examines the contents of depth buffer 80 associated therewith. In the event the associated contents of depth buffer 80 of memory 70 is smaller than one, i.e. there is a physical object rendered at that pixel, processor 40 performs a ray trace algorithm on the pixel. Ray trace algorithms are well known to those skilled in the art, and therefore in the interest of brevity are not detailed. In the event that the associated contents of depth buffer 80 at the pixel is one, i.e. the pixel reflects an environmental object only, the color for that pixel is selected from color buffer 85 of memory 70. When the iteration of all pixels is complete, the resulting pixel buffer is presented in the view port for display on monitor 60.

Figure 2A:
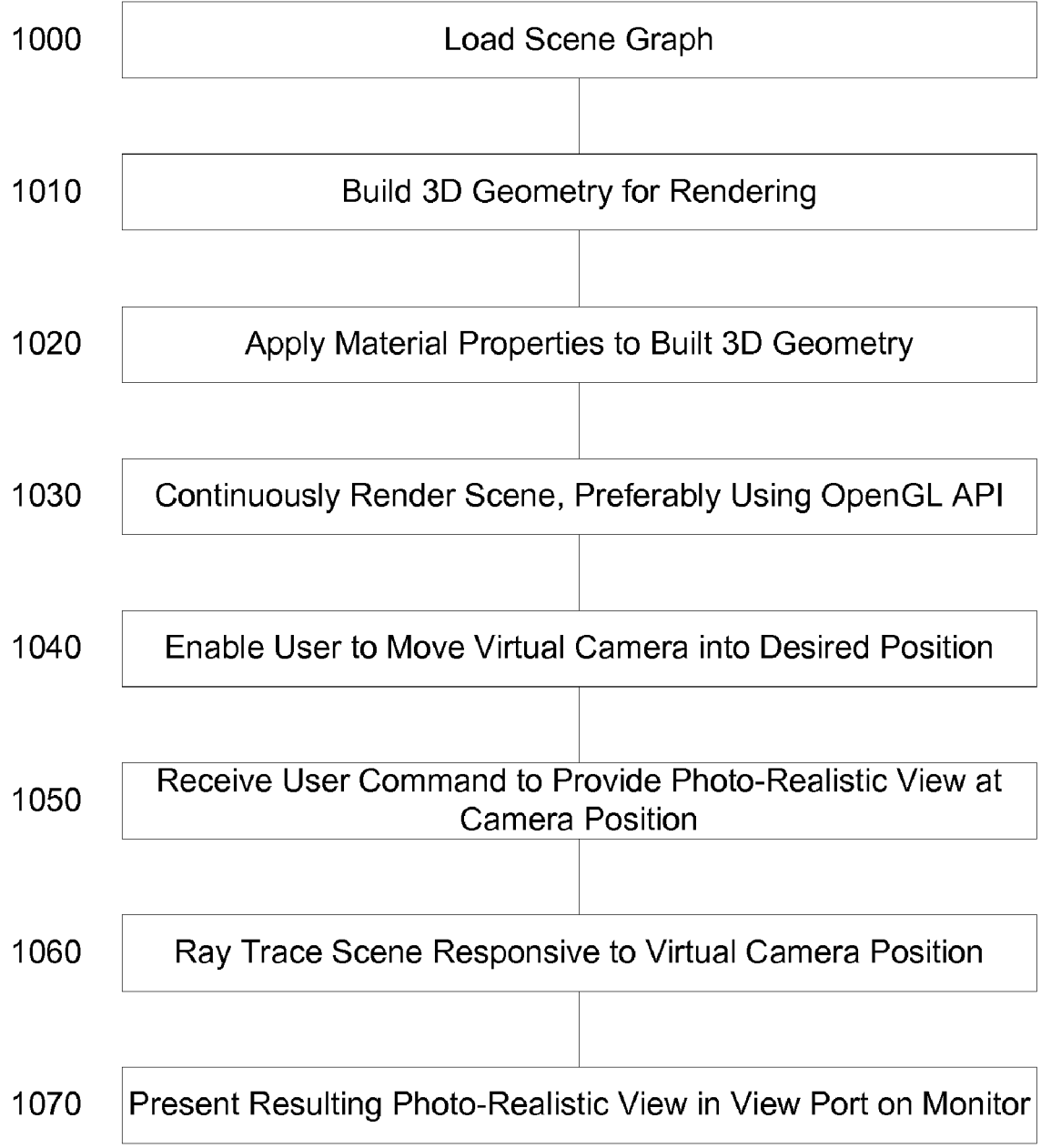
FIG. 2A illustrates a high level flow chart of a method of converting a scene-graph into a real-time interactive 3D simulation and generating a photo-realistic view on demand in accordance with a principle of the current invention.

FIG. 2A illustrates a high level flow chart of a method of converting a scene-graph into a real-time interactive 3D simulation and generating a photo-realistic view on demand in accordance with a principle of the current invention. In stage 1000, the scene graph is loaded. Preferably the scene graph is loaded from a file stored on memory 70, preferably in other memory locations 85. In stage 1010 a 3D geometry is built for rendering the scene. In stage 1020 material properties are applied to the 3-D geometry of stage 1010. In a preferred embodiment stages 1010 and 1020 are performed in accordance with the teaching of U.S. patent application Ser. No. 11/538,103 filed Oct. 3, 2006 to Elsberg et al referenced above, and incorporated herein by reference.

In stage 1030, the scene is continuously rendered as a real-time interactive 3D simulation, preferably using OpenGL API. Typically, the scene being continuously rendered comprises both physical objects and environmental objects. The use of OpenGL API reduces the computational intensiveness required of processor 40 by transferring the load to graphics card 30. In stage 1040, the user is enabled to move a virtual camera into a desired position on the scene rendered in stage 1030. In particular, the user moves the virtual camera via user input device 50. In stage 1050, when the user has determined that the virtual camera is in the desired position for which a photorealistic view is required, a user command is input via user input device 50 to produce a photorealistic view of the real-time interactive 3D simulation at the current camera position.

The above has been described in an embodiment in which the photorealistic view is responsive to the current camera position; however this is not meant to be limiting in any way. In another embodiment the user selects a particular view via the user input device 50 without requiring the use of the virtual camera.

In stage 1060, the scene rendered in 1030, is ray traced as a function of the camera position of stage 1040, 1050. In one embodiment, the rendering of a photo-realistic image is accomplished in accordance with methods known to the prior art. In a preferred embodiment, ray tracing is accomplished in accordance with the method of FIG. 2B to be described further hereinto below. In stage 1070, the resulting photorealistic view of the ray tracing of stage 1060 is presented in a view port on monitor 60.

Thus, the method of FIG. 2A converts a scene graph, loaded from a file, to a photorealistic view responsive to a user command and the virtual camera position.

Figure 2B:
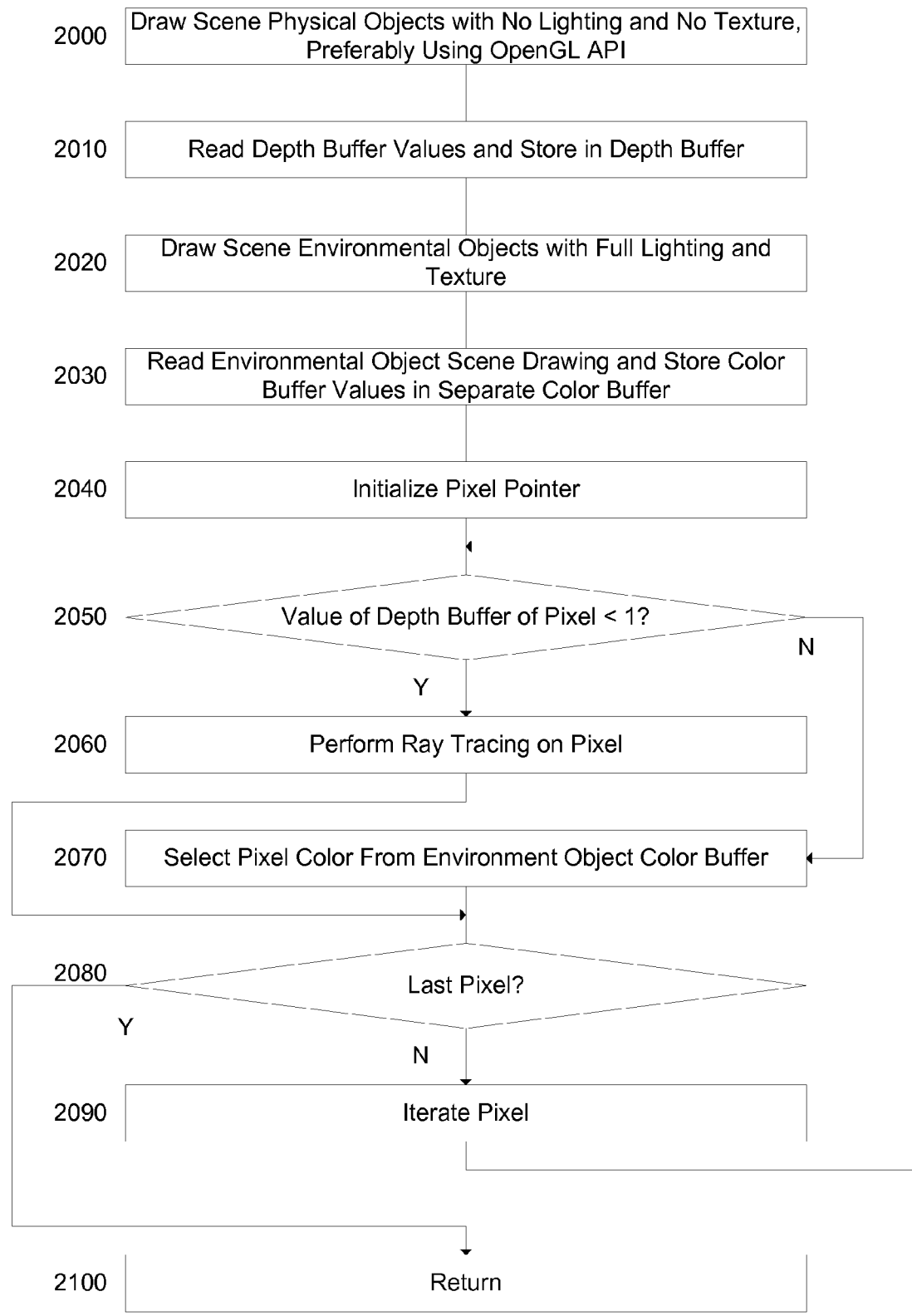
FIG. 2B illustrates a high level flow chart of a method of ray tracing suitable for use in the method of FIG. 2A, exhibiting an automated expert system to reduce the computational intensiveness, in accordance with a principle of the current invention.

FIG. 2B illustrates a high level flow chart of a method of ray tracing suitable for use in the method of FIG. 2A, exhibiting an automated expert system to reduce the computational intensiveness, in accordance with a principle of the current invention. The method of FIG. 2B is presented as a subroutine to be called for the performance of stage 1060 of FIG. 2A; however this is not meant to be limiting in any way. In another embodiment the method of FIG. 2B is embedded within the method of FIG. 2A without exceeding the scope of the invention.

In stage 2000, the physical objects of the scene of stages 1030, 1040 are drawn with no lighting and no texture. Preferably the physical objects of the scene are drawn using OpenGL API to reduce the computational intensiveness required of processor 40 by transferring the load to graphics card 30. In stage 2010, the depth buffer values of the drawn physical objects of stage 2000 are read by processor 40 from graphics card 30 and preferably stored in depth buffer 80 of memory 70.

In stage 2020, the environmental objects of the scene of stages 1030, 1040 are drawn with full lighting and texture. Preferably the physical objects of the scene are drawn using OpenGL API to reduce the computational intensiveness required of processor 40 by transferring the computational load to graphics card 30. In stage 2030, the color buffer values of the drawn environmental objects of stage 2020 are read by processor 40 from graphics card 30 and stored in color buffer 85 of memory 70, separate from the depth buffer values stored in stage 2010.

In stage 2040, a pixel pointer is initialized. The pixel pointer is used in cooperation with stages 2080, 2090, to be described further below, to iterate the viewport pixel by pixel. In stage 2050, the value of depth buffer 80 associated with the current pixel, as stored in stage 2010, is compared with one. It is to be understood that a depth buffer value of one is indicative of infinity, i.e. that no physical objects occur at the current pixel and only an environmental object is present. In the event that in stage 2050 the value of depth buffer 80 associated with the current pixel is less than one, in stage 2060 ray tracing is performed on the pixel indicated by the current pixel pointer. Ray tracing algorithms are well known to those skilled in the art, and thus in the interest of brevity are not detailed.

In stage 2080, the current pixel pointer is compared with a last pixel indicator. In the event that a last pixel has not yet been iterated, in stage 2090 the pixel point is iterated and stage 2050, as described above, is performed. In the event that in stage 2080 a last pixel has been iterated, i.e. the scene has been fully prepared, in stage 2100 the method of FIG. 2B returns.

In the event that in stage 2050, the value of depth buffer 80 associated with the current pixel is equal to one, in stage 2070 the pixel color is selected from color buffer 85 associated with the environmental objects stored in stage 2030. Thus, ray tracing is not performed for pixels reflecting environmental objects, thereby reducing the computational intensiveness of the ray tracing of the scene of stage 1060 of FIG. 2A.

Thus the present embodiments enable an integrated system providing real-time interactive 3D simulation and a mechanism for generating photo-realistic views on demand of the real-time interactive 3D simulation. By combining the two technologies into one system the invention provides an innovative solution which addresses the needs for both real-time interactive 3D simulations and photo-realistic results in an automated system which can be operated effectively by a user with basic computer operating skills. Preferably, an automated expert system is implemented to optimize the aesthetic results of the ray tracing process.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

We claim:

1. A computer implemented method of providing a photo-realistic view on demand of a real-time interactive three dimensional simulation, the method comprising:
    providing a real-time interactive three dimensional simulation comprising physical objects and environmental objects;
    selecting a camera position; and
    ray tracing said provided real-time interactive three dimensional simulation as a function of said selected camera position thereby providing the photo-realistic view, said ray tracing comprising:
        drawing all physical objects of said provided real-time interactive three dimensional simulation as a function of said selected camera position with no lighting and no textures;
        reading the depth buffer values corresponding to said drawing with no lighting and no textures;
        drawing all environmental objects of said provided real-time interactive three dimensional simulation as a function of said selected camera position with lighting and textures;
        storing the color of each of said drawn environmental objects in a color buffer;
        iterating said provided real-time interactive three dimensional simulation as a function of said selected camera position pixel by pixel; and
        performing, in the event that the depth buffer value of a particular pixel is less than one, a ray tracing algorithm on the particular pixel.

2. A computer implemented method according to claim 1, further comprising:
    selecting, in the event that the depth buffer value of a particular pixel is not less than one, the color for said pixel from said color buffer.

3. A computer implemented method according to claim 1, further comprising:
    presenting said photo-realistic view provided by said ray tracing in a view port.

4. A computer implemented method according to claim 1, wherein said drawing environmental objects of said provided real-time interactive three dimensional simulation as a function of said selected camera position with lighting and textures utilizes an OpenGL application programming interface.

5. A computer implemented method according to claim 1, wherein said providing a real-time interactive three dimensional simulation comprises:
    loading a scene-graph;
    building a three dimensional geometry for rendering said loaded scene-graph;
    applying material properties to said built three dimensional geometry; and
    continuously rendering said loaded scene graph responsive to said built three dimensional geometry and applied material properties.

6. A computing system for providing a photo-realistic view on demand of a real-time interactive three dimensional simulation comprising physical objects and environmental objects, the computing system comprising a computer, a memory comprising a color buffer, a monitor, and a user input device, the computer arranged to:
    enable the selection, via said user input device, of a camera position associated with a real-time interactive three dimensional simulation; and
    ray trace said real-time interactive three dimensional simulation as a function of said selected camera position thereby providing the photo-realistic view, said arrangement of said computer to ray trace comprising:
        drawing all physical objects of said provided real-time interactive three dimensional simulation as a function of said selected camera position with no lighting and no textures;
        reading the depth buffer values corresponding to said drawing with no lighting and no textures;
        drawing all environmental objects of said provided real-time interactive three dimensional simulation as a function of said selected camera position with lighting and textures;
        storing the color of each of said drawn environmental objects in said color buffer of said memory;
        iterating said provided real-time interactive three dimensional simulation as a function of said selected camera position pixel by pixel; and
        performing, in the event that the depth buffer value of a particular pixel is less than one, a ray trace algorithm on the particular pixel.

7. A computing system according to claim 6, wherein the computer is further arranged to produce said real-time interactive three dimensional simulation from a scene graph stored on said memory.

8. A computing system according to claim 6, wherein said arrangement of said computer to ray trace further comprises:
    selecting, in the event that the depth buffer value of a particular pixel is not less than one, the color for said pixel from said color buffer.

9. A computing system according to claim 6, wherein said memory further comprises a depth buffer, said computer being further arranged to:
    store said read depth buffer values on said depth buffer of said computer,
    said performing, in the event that the depth buffer value of a particular pixel being less than one, and said selecting in the event that the depth buffer value of a particular pixel being not less than one, being responsive to said stored depth buffer of said computer.

10. A computing system according to claim 6, wherein said computer is further arranged to present said photo-realistic view provided by said ray trace in a view port on said monitor.

11. A computing system according to claim 6, wherein said environmental objects are drawn via an OpenGL application programming interface.

12. A computing system according to claim 6, wherein said computer is further arranged to:
    load a scene-graph from said memory;
    build a three dimensional geometry for rendering said loaded scene-graph;
    apply material properties to said built three dimensional geometry; and
    continuously render said loaded scene-graph responsive to said built three dimensional geometry and applied material properties,
    thereby producing said real-time interactive three dimensional simulation.

13. A non-transitory computer-readable medium containing instructions for controlling a data processing system to perform a method of providing a photo-realistic view on demand of a real-time interactive three dimensional simulation comprising physical objects and environmental objects, the method comprising:
- providing a real-time interactive three dimensional simulation;
- selecting a camera position; and
- ray tracing said provided real-time interactive three dimensional simulation as a function of said selected camera, position thereby providing the photo-realistic view, said ray tracing comprising:
  - drawing all physical objects of said provided real-time interactive three dimensional simulation as a function of said selected camera position with no lighting and no textures;
  - reading the depth buffer values corresponding to said drawing with no lighting and no textures;
  - drawing all environmental objects of said provided real-time interactive three dimensional simulation as a function of said selected camera position with lighting and textures;
  - storing the color of each of said drawn environmental objects in a color buffer;
  - iterating said provided real-time interactive three dimensional simulation as a function of said selected camera position pixel by pixel; and
  - performing, in the event that the depth buffer value of a particular pixel is less than one, a ray tracing algorithm on the particular pixel.

14. A non-transitory computer-readable medium according to claim 13, wherein said method further comprises:
- selecting, in the event that the depth buffer value of a particular pixel is not less than one, the color for said pixel from said color buffer.

15. A non-transitory computer-readable medium according to claim 13, wherein said method further comprises:
- presenting said photo-realistic view provided by said ray tracing in a view port.

16. A non-transitory computer-readable medium according to claim 13, wherein said drawing environmental objects of said provided real-time interactive three dimensional simulation as a function of said selected camera position with lighting and textures utilizes an OpenGL application programming interface.

17. A non-transitory computer-readable medium according to claim 13, wherein said providing a real-time interactive three dimensional simulation comprises:
- loading a scene-graph;
- building a three dimensional geometry for rendering said loaded scene-graph;
- applying material properties to said built three dimensional geometry; and
- continuously rendering said loaded scene-graph responsive to said built three dimensional geometry and applied material properties.

* * * * *